July 16, 1935. G. O. DUESLER 2,007,957
SUPPORTS FOR DUMP BODIES AND THE LIKE
Filed July 21, 1934 2 Sheets-Sheet 2
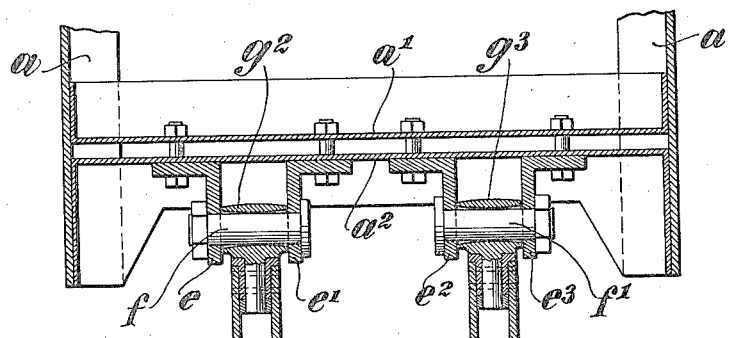
Fig. 2
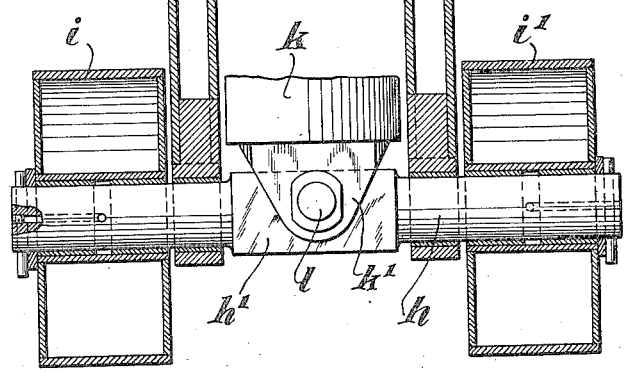
INVENTOR:
George O. Duesler,
BY
Redding, Greeley, O'Shea and Campbell
HIS ATTORNEYS Patented July 16, 1935

2,007,957

UNITED STATES PATENT OFFICE 2,007,957

SUPPORT FOR DUMP BODIES AND THE LIKE

George O. Duesler, Los Angeles, Calif., assignor to International Motor Company, New York, N. Y., a corporation of Delaware Application July 21, 1934, Serial No. 736,281

7 Claims. (Cl. 298—17)

This invention relates generally to supports for overhanging bodies of vehicles and while it will be evident to one skilled in the art that it may be applied to any type of vehicle where an analogous problem is presented, it is found particularly advantageous for association with dump bodies. In practice, it is desirable, of course, to provide a dump body which may be readily rocked about its pivotal support and yet the most favorable conditions for dumping often result in too great a turning moment at the discharge end as when, for instance, a large load is suddenly impressed on the overhanging portion of the body at some distance from the pivotal support. Where large rocks are handled or sticky material which does not slide freely and uniformly from the body, it often happens that a concentrated load is suddenly impressed on the overhanging portion and the vehicle itself is tilted at its forward end. Meanwhile, the rear end of the body may be brought violently into contact with the supporting surface and possible damage result.

The principal object of the present invention is to provide a support for the rear end of an overhanging body which will function automatically at all times and without any attention on the part of the operator to check the downward movement of the overhanging portion without stopping such movement until a predetermined position has been reached. More particularly, it is an object of the invention to provide a supporting dolly for the overhanging end of a vehicle which shall have interposed operatively between the supporting wheels and the body a suitable device for retarding the movement of the overhanging end. In accordance with the invention the device used is hydraulic and because of its relationship to the overhanging body and to the supporting dolly the fluid retards the movement of the overhanging portion to any desired extent, an adjustable by-pass for the fluid being employed. Still another object of the invention is to provide a support of the character indicated which will positively check further movement of a tilting body when it has reached a predetermined position and thereafter constitute an immovable support therefor. A further object of the invention is to provide a support which shall be of simple and rugged construction and operable without manipulation by the operator so that its parts shall always be in the desired relationship to permit normal operation of the vehicle and yet check tilting movement of the body when necessary.

The construction will be described in greater detail in connection with the embodiment shown by way of example in the accompanying drawings, in which:

Figure 2 is a view in horizontal section through the improved support and taken on the plane indicated by the line 2—2 of Figure 1 and looking in the direction of the arrows.

Figure 1:
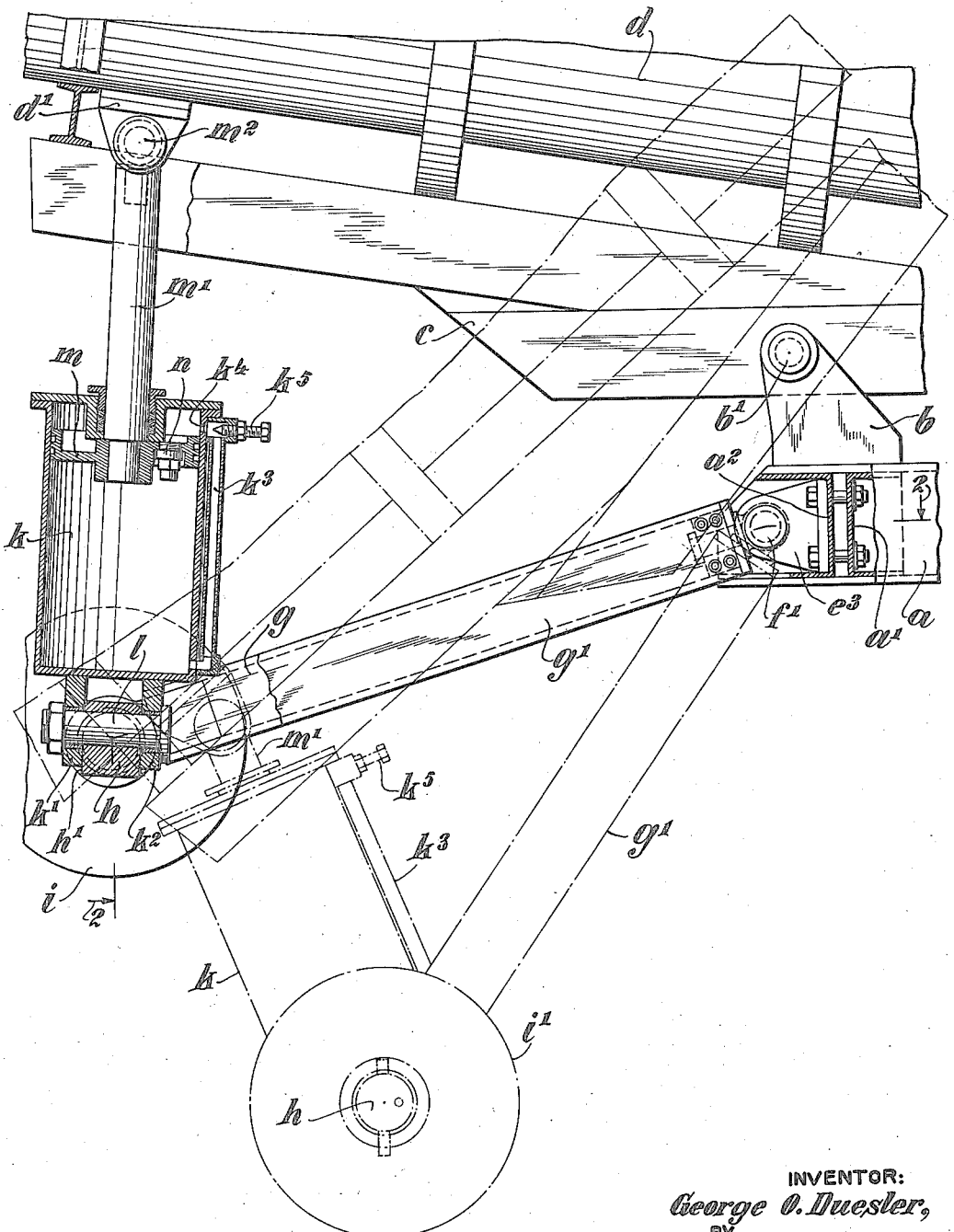
Figure 1 is a fragmentary view partly in side elevation and partly in section showing an improved supporting dolly in its relationship to the chassis and dump body of a vehicle.

As indicated before, the invention is not to be restricted to the type of vehicle with which it is associated. There is indicated in Figure 1 a chassis $a$ of a vehicle having supporting brackets $b$ on which is pivotally mounted as at $b'$ the frame $c$ for a body $d$. The body and frame are tiltable about the pivotal support $b'$ for discharging the contents of the body, all as will be understood. Mounted in the chassis $a$ are cross-frame members $a'$, $a^2$ carrying rearwardly extending brackets $e$, $e'$, $e^2$, $e^3$, arranged in pairs respectively. The brackets $e$, $e'$, support a pin $f$ and the brackets $e^2$, $e^3$, support a pin $f'$. On the pins are journaled pivotally radius rods $g$, $g'$, respectively, the bearing members of which $g^2$, $g^3$, respectively, may be of such character as to permit lateral movement of the two rods with respect to their supporting pins, as may be desirable. The free ends of the rods support an axle $h$ in suitable plain bearings and on the ends of the axle at opposite sides of the rods are journaled supporting wheels $i$, $i'$. It will be evident that the axle $h$ is freely rotatable in the radius rods $g$, $g'$, as is desirable for the reason which will later appear. Interposed operatively between the dolly described and the body $d$ is a device for retarding tilting movement of the body. In the embodiment illustrated in the drawings, a hydraulic cylinder $k$ is shown with its lower end pivotally connected to the axle $h$. The axle $h$ is formed with opposed parallel flattened sides $h'$ at a point between the radius rods $g$, $g'$. With these flattened sides engage depending brackets $k'$, $k^2$, respectively, secured to the end of the cylinder $k$. A pin $l$ passes through these brackets $k'$, $k^2$, and through the flattened section of the axle $h$ thereby securing the hydraulic cylinder to the axle with capacity for universal movement with respect to the radius rods $g$, $g'$. Within the cylinder $k$ is mounted a piston $m$, the rod $m'$ of which is pivotally attached as at $m^2$ to a bracket $d'$ carried by the body $d$. The cylinder $k$ is provided with a by-pass $k^3$ communicating with opposite sides of the piston $m$ through a port $k^4$ controllable by an adjustable valve $k^5$ so that the rate of movement of the fluid within the cylinder from one side of the piston to the other can be regulated to advantage. Within the piston $m$ may be mounted a check valve indicated conventionally at $n$ by which the free flow of liquid from one side of the piston to the other may be afforded while at the same time flow in the opposite direction is positively checked.

In use, with the body $d$ in its normal position on the chassis $a$, the parts will be in the position illustrated in Figure 1 where the piston rod $m'$ is fully extended. The engagement of the piston with the cylinder will serve to support the dolly in elevated position so that free operation of the vehicle is not interfered with. When the body $d$ is tilted for dumping the dolly will move downwardly with the body about the pins $f$, $f'$, until the wheels engage the ground or other supporting surface. Continued tilting of the body $d$ with liquid in the cylinder $k$ below the piston $m$ will cause the piston $m$ to move downwardly in the cylinder and force the liquid through the by-pass $k^3$ and duct $k^4$ at such a rate as is permitted by the valve $k^5$. In this way, movement of the body is checked but not stopped and the load in the overhanging portion of the body is supported partially on the dolly. No matter how concentrated this load may become the dolly relieves the chassis of a turning moment sufficient to tilt it and at the same time the hydraulic device prevents the body from tilting at such a rapid rate as might result in damage. In the preferred form the parts are so related that when the body has assumed its intended maximum angle for dumping (as indicated in dotted lines in Figure 1) the piston $m$ will be found at the lower end of the cylinder $k$ and further tilting movement of the body will be positively checked. When the body commences its return movement to normal position on the chassis the piston $m$ will be pulled upwardly in the cylinder $k$ and, if desired, a check valve $n$ within the piston may permit the liquid to flow freely therethrough so that little resistance is offered to this return movement of the piston. When the piston reaches the upper end of the cylinder continued movement of the body will bring about the raising of the dolly wheels $i$ from the ground, the entire assembly moving about the pins $f$, $f'$, by reason of the interposition of the radius rods $g$, $g'$. It will be seen that the parts function automatically without any attention or manipulation on the part of the operator and are always to be found in the relationship necessary to perform their intended purpose.

Changes in details of construction may be made without departing from the invention.

I claim as my invention:

1. In combination with a chassis of a vehicle, a body mounted tiltably thereon, a support carried by the overhanging portion of said body and movable therewith into engagement with the ground, means interposed between said support and the chassis to fix the path of movement of said support, and a hydraulic device interposed between the support and the overhanging portion of the body to retard movement of the overhanging portion when the support engages the ground.

2. In combination with the chassis of a vehicle, a body tiltably supported thereon, a support for the overhanging portion, a radius rod pivotally connected to the chassis and to the support, hydraulic mechanism comprising a cylinder and a piston movable in the cylinder in one direction against the resistance of a liquid, one of said parts being connected to said support and the other of said parts being connected to the body, whereby tilting movement of the body is retarded when the support engages the ground.

3. In a vehicle having a chassis and a body tiltably mounted thereon, a supporting dolly for the overhanging portion of the body, a radius rod interposed between the dolly and the chassis, a hydraulic cylinder connected to the dolly and having a by-pass therein, and a piston within the cylinder connected to the overhanging portion of the body, whereby tilting movement of the body is retarded hydraulically when the dolly engages the ground.

4. In a vehicle having a chassis and a body tiltably mounted thereon, a supporting dolly for the overhanging portion of the body, a radius rod interposed between the dolly and the chassis, a hydraulic cylinder connected to the dolly and having a by-pass therein, a piston within the cylinder connected to the overhanging portion of the body whereby tilting movement of the body is retarded hydraulically when the dolly engages the ground, and means to control said by-pass.

5. In a vehicle in combination with a chassis, a body tiltably mounted thereon, a supporting dolly for the overhanging portion of the body comprising an axle and wheels, radius rods connected with the axle and with the chassis, a hydraulic cylinder pivotally connected with the axle and having a by-pass therein for liquid, and a piston within the cylinder connected pivotally with the overhanging portion of the body whereby movement of the piston in the cylinder is retarded when the wheels engage the ground and until the piston engages the lower end of the cylinder.

6. In combination with a vehicle chassis, a member tiltably mounted thereon, a support connected to the member and movable into engagement with the ground to check tilting movement thereof, and means movable with respect to the chassis interposed between said support and the vehicle chassis to fix the path of travel of the support, the support being formed with means to retard the tilting movement of said member.

7. In combination with a vehicle chassis, a body mounted tiltably thereon, a support for the overhanging portion of said body movable into engagement with the ground, and means connecting said support movably to said chassis to fix the path of movement of the support, the support being formed with means to retard the tilting movement of the overhanging portion of said body.

GEORGE O. DUESLER.